US012412156B1

(12) United States Patent
Ryan et al.

(10) Patent No.: US 12,412,156 B1
(45) Date of Patent: Sep. 9, 2025

(54) SYSTEMS AND METHODS TO CHARACTERIZE WORK UNIT RECORDS OF A COLLABORATION ENVIRONMENT BASED ON FREEFORM ARRANGEMENT OF VISUAL CONTENT ITEMS

(71) Applicant: Asana, Inc., San Francisco, CA (US)

(72) Inventors: Alexander Thomas Ryan, San Francisco, CA (US); Micah Hanan Fenner, Amsterdam (NL)

(73) Assignee: Asana, Inc., San Francisco, CA (US)

( * ) Notice: Subject to any disclaimer, the term of this patent is extended or adjusted under 35 U.S.C. 154(b) by 179 days.

(21) Appl. No.: 17/882,258

(22) Filed: Aug. 5, 2022

Related U.S. Application Data

(60) Provisional application No. 63/391,217, filed on Jul. 21, 2022.

(51) Int. Cl.
*G06F 3/048* (2013.01)
*G06F 3/0481* (2022.01)
*G06Q 10/10* (2023.01)
*G06F 3/0486* (2013.01)

(52) U.S. Cl.
CPC ......... *G06Q 10/103* (2013.01); *G06F 3/0481* (2013.01); *G06F 3/0486* (2013.01)

(58) Field of Classification Search
CPC .... G06Q 10/103; G06F 3/0481; G06F 3/0486
See application file for complete search history.

(56) References Cited

U.S. PATENT DOCUMENTS

| 5,233,687 A | 8/1993 | Henderson, Jr. |
| 5,524,077 A | 6/1996 | Faaland |
| 5,530,861 A | 6/1996 | Diamant |
| 5,548,506 A | 8/1996 | Srinivasan |
| 5,608,898 A | 3/1997 | Turpin |

(Continued)

FOREIGN PATENT DOCUMENTS

| CN | 101305350 A | 11/2008 |
| CN | 101563671 A | 10/2009 |

(Continued)

OTHER PUBLICATIONS

Shivakumar; Complete Guide to Digital Project Management; 2018; Apress; (https://doi.org/10.1007/978-1-4842-3417-4; last access Mar. 6, 2023).

(Continued)

*Primary Examiner* — Rashawn N Tillery
(74) *Attorney, Agent, or Firm* — Esplin & Associates, PC

(57) ABSTRACT

Systems and methods to characterize work unit records of a collaboration environment based on freeform arrangement of visual content items are described herein. Exemplary implementations may: manage environment state information maintaining a collaboration environment including work unit records; effectuate presentation of instances of a user interface of the collaboration environment on client computing platforms associated with the users; obtain arrangement information for the visual content items displayed in the user interface; modify, based on the arrangement information, one or more of the values of one or more of the work unit parameters for one or more of the work unit records represented by the collections of the visual content items; and/or perform other operations.

20 Claims, 3 Drawing Sheets

(56) References Cited

U.S. PATENT DOCUMENTS

| | | | |
|---|---|---|---|
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,578,004 B1 | 6/2003 | Cimral |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,613,688 B2 | 11/2009 | Wiest |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,991,632 B1 | 8/2011 | Morris |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,352,310 B1 | 1/2013 | Bessler |
| 8,365,065 B2 | 1/2013 | Gejdos |
| 8,499,300 B2 | 7/2013 | Zimberg |
| 8,522,240 B1 | 8/2013 | Merwarth |
| 8,527,287 B1 | 9/2013 | Bhatia |
| 8,531,447 B2* | 9/2013 | Walker ................ G06T 11/60 |
| | | 345/418 |
| 8,554,832 B1 | 10/2013 | Moskovitz |
| 8,572,477 B1 | 10/2013 | Moskovitz |
| 8,583,579 B1 | 11/2013 | Seth |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 8,909,631 B1 | 12/2014 | Seth |
| 8,938,690 B1* | 1/2015 | Khouri ................ G06Q 50/01 |
| | | 715/753 |
| 9,009,096 B2 | 4/2015 | Pinckney |
| 9,024,752 B2 | 5/2015 | Tumayan |
| 9,122,834 B1* | 9/2015 | Caluya ................ G06F 30/367 |
| 9,143,839 B2 | 9/2015 | Reisman |
| 9,152,668 B1 | 10/2015 | Moskovitz |
| 9,189,756 B2 | 11/2015 | Gilbert |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,372,596 B2 | 6/2016 | Breedvelt-Schouten |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,836,183 B1* | 12/2017 | Love ................ G06F 16/904 |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,423,927 B2 | 9/2019 | Hamilton |
| 10,454,911 B2 | 10/2019 | Hanhirova |
| 10,455,011 B2 | 10/2019 | Kendall |
| 10,496,943 B2 | 12/2019 | De |
| 10,586,211 B2 | 3/2020 | Steplyk |
| 10,594,788 B2 | 3/2020 | Larabie-Belanger |
| 10,606,859 B2 | 3/2020 | Smith |
| 10,613,735 B1 | 4/2020 | Karpe |
| 10,614,404 B2 | 4/2020 | Guo |
| 10,616,151 B1 | 4/2020 | David |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1* | 9/2020 | Raghavan ................ G06Q 10/06 |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1* | 12/2021 | Sabo ................ G06F 3/0482 |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Ye |
| 11,443,281 B2 | 9/2022 | Culver |
| 11,449,836 B1* | 9/2022 | Clifton ................ G06F 3/0482 |
| 11,500,620 B2 | 11/2022 | Scolnick |
| 11,501,063 B2 | 11/2022 | Norota |
| 12,093,896 B1* | 9/2024 | Beauchamp ........ G06Q 10/101 |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0106039 A1 | 6/2003 | Rosnow |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0122693 A1 | 6/2004 | Hatscher |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |

(56) References Cited

U.S. PATENT DOCUMENTS

| | | |
|---|---|---|
| 2004/0230447 A1 | 11/2004 | Schwerin-Wenzel |
| 2004/0268451 A1 | 12/2004 | Robbin |
| 2005/0027582 A1 | 2/2005 | Chereau |
| 2005/0210394 A1 | 9/2005 | Crandall |
| 2005/0216111 A1 | 9/2005 | Ooshima |
| 2005/0216830 A1 | 9/2005 | Turner |
| 2005/0222971 A1 | 10/2005 | Cary |
| 2005/0234886 A1 | 10/2005 | Mohraz |
| 2005/0262081 A1* | 11/2005 | Newman .............. G06F 16/904 707/999.009 |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239573 A1 | 10/2007 | Tien |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0033876 A1 | 2/2008 | Goldman |
| 2008/0034314 A1 | 2/2008 | Louch |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133736 A1 | 6/2008 | Wensley |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313110 A1 | 12/2008 | Kreamer |
| 2009/0048986 A1 | 2/2009 | Anderson |
| 2009/0055796 A1* | 2/2009 | Springborn .............. G06F 8/20 717/102 |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1 | 8/2009 | McWhinnie |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0100594 A1 | 4/2010 | Frees |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0306007 A1 | 12/2010 | Ganapathyraj |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0258582 A1* | 10/2011 | Bang .............. G06F 3/04817 715/830 |
| 2011/0270644 A1 | 11/2011 | Roncolato |
| 2011/0302003 A1 | 12/2011 | Shirish |
| 2011/0307100 A1 | 12/2011 | Schmidtke |
| 2011/0307771 A1 | 12/2011 | Lok |
| 2011/0307772 A1 | 12/2011 | Lloyd |
| 2012/0030194 A1 | 2/2012 | Jain |
| 2012/0035942 A1 | 2/2012 | Graupner |
| 2012/0041983 A1 | 2/2012 | Jennings |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0210247 A1* | 8/2012 | Khouri .............. G06Q 10/101 715/751 |
| 2012/0221963 A1 | 8/2012 | Motoyama |
| 2012/0226617 A1 | 9/2012 | Kay |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |

(56) References Cited

U.S. PATENT DOCUMENTS

| | | | |
|---|---|---|---|
| 2013/0066944 A1 | 3/2013 | Laredo | |
| 2013/0067375 A1 | 3/2013 | Kim | |
| 2013/0067549 A1 | 3/2013 | Caldwell | |
| 2013/0073328 A1 | 3/2013 | Ehrler | |
| 2013/0080919 A1 | 3/2013 | Kiang | |
| 2013/0103412 A1 | 4/2013 | Nudd | |
| 2013/0124254 A1 | 5/2013 | Jafri | |
| 2013/0124638 A1 | 5/2013 | Barreto | |
| 2013/0151421 A1* | 6/2013 | Van Der Ploeg | G06Q 10/06 705/301 |
| 2013/0151604 A1 | 6/2013 | Ranade | |
| 2013/0173486 A1 | 7/2013 | Peters | |
| 2013/0179208 A1 | 7/2013 | Chung | |
| 2013/0179799 A1 | 7/2013 | Savage | |
| 2013/0198676 A1 | 8/2013 | Garrett | |
| 2013/0215116 A1 | 8/2013 | Siddique | |
| 2013/0227007 A1 | 8/2013 | Savage | |
| 2013/0246110 A1 | 9/2013 | Nakhayi Ashtiani | |
| 2013/0246399 A1 | 9/2013 | Schneider | |
| 2013/0275229 A1 | 10/2013 | Moganti | |
| 2013/0279685 A1 | 10/2013 | Kohler | |
| 2013/0317871 A1 | 11/2013 | Kulkarni | |
| 2013/0321467 A1 | 12/2013 | Tappen | |
| 2013/0339099 A1 | 12/2013 | Aidroos | |
| 2013/0339831 A1 | 12/2013 | Gulanikar | |
| 2014/0007005 A1 | 1/2014 | Libin | |
| 2014/0012603 A1 | 1/2014 | Scanlon | |
| 2014/0012616 A1 | 1/2014 | Moshenek | |
| 2014/0025767 A1 | 1/2014 | De Kezel | |
| 2014/0036639 A1 | 2/2014 | Boni | |
| 2014/0040780 A1 | 2/2014 | Artzt | |
| 2014/0040905 A1 | 2/2014 | Tsunoda | |
| 2014/0058801 A1 | 2/2014 | Deodhar | |
| 2014/0059910 A1 | 3/2014 | Norton | |
| 2014/0074536 A1 | 3/2014 | Meushar | |
| 2014/0075004 A1 | 3/2014 | Van Dusen | |
| 2014/0089719 A1 | 3/2014 | Daum | |
| 2014/0101310 A1 | 4/2014 | Savage | |
| 2014/0143000 A1 | 5/2014 | Kay | |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0201131 A1 | 7/2014 | Burman | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0304836 A1 | 10/2014 | Velamoor | |
| 2014/0310047 A1 | 10/2014 | De | |
| 2014/0310051 A1 | 10/2014 | Meng | |
| 2014/0337279 A1 | 11/2014 | Mo | |
| 2014/0350997 A1 | 11/2014 | Holm | |
| 2014/0364987 A1 | 12/2014 | Shikano | |
| 2014/0372860 A1 | 12/2014 | Craven | |
| 2015/0006448 A1 | 1/2015 | Gupta | |
| 2015/0007058 A1 | 1/2015 | Wooten | |
| 2015/0007336 A1 | 1/2015 | Zang | |
| 2015/0012330 A1 | 1/2015 | Sugiura | |
| 2015/0052437 A1 | 2/2015 | Crawford | |
| 2015/0058053 A1 | 2/2015 | De | |
| 2015/0098561 A1 | 4/2015 | Etison | |
| 2015/0113540 A1 | 4/2015 | Rabinovici | |
| 2015/0134393 A1 | 5/2015 | De | |
| 2015/0153906 A1 | 6/2015 | Liao | |
| 2015/0193735 A1 | 7/2015 | Lavrov | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0294253 A1 | 10/2015 | Bhat | |
| 2015/0312113 A1* | 10/2015 | Forutanpour | H04W 8/005 709/224 |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363481 A1 | 12/2015 | Haynes | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0182311 A1 | 6/2016 | Borna | |
| 2016/0188145 A1 | 6/2016 | Vida | |
| 2016/0216854 A1 | 7/2016 | McClellan | |
| 2016/0224939 A1 | 8/2016 | Chen | |
| 2016/0234391 A1 | 8/2016 | Wolthuis | |
| 2016/0241609 A1* | 8/2016 | Xin | G06F 3/0484 |
| 2016/0275068 A1 | 9/2016 | Wenzel | |
| 2016/0275436 A1 | 9/2016 | Kurjanowicz | |
| 2016/0307210 A1 | 10/2016 | Agarwal | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0061341 A1 | 3/2017 | Haas | |
| 2017/0068933 A1 | 3/2017 | Norton | |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0147960 A1 | 5/2017 | Jahagirdar | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0206501 A1 | 7/2017 | Wang | |
| 2017/0249574 A1 | 8/2017 | Knijnik | |
| 2017/0249577 A1 | 8/2017 | Nishikawa | |
| 2017/0262294 A1 | 9/2017 | Yakan | |
| 2017/0316358 A1 | 11/2017 | Candito | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0337517 A1 | 11/2017 | Defusco | |
| 2017/0344754 A1 | 11/2017 | Kumar | |
| 2017/0346861 A1 | 11/2017 | Pearl | |
| 2017/0351385 A1 | 12/2017 | Ertmann | |
| 2017/0364214 A1 | 12/2017 | Javed | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |

(56) References Cited

U.S. PATENT DOCUMENTS

| | | | |
|---|---|---|---|
| 2018/0082255 A1 | 3/2018 | Rosati | |
| 2018/0088754 A1 | 3/2018 | Psenka | |
| 2018/0089625 A1 | 3/2018 | Rosati | |
| 2018/0095938 A1 | 4/2018 | Monte | |
| 2018/0101807 A1 | 4/2018 | Ni | |
| 2018/0102989 A1 | 4/2018 | Borsutsky | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189735 A1 | 7/2018 | Lo | |
| 2018/0189736 A1 | 7/2018 | Guo | |
| 2018/0190145 A1* | 7/2018 | Nakayama | G09B 5/02 |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0285746 A1 | 10/2018 | Dunwoody | |
| 2018/0300305 A1 | 10/2018 | Lam | |
| 2018/0316636 A1 | 11/2018 | Kamat | |
| 2018/0331842 A1 | 11/2018 | Faulkner | |
| 2018/0336520 A1* | 11/2018 | Davis | G06Q 10/103 |
| 2018/0349108 A1* | 12/2018 | Brebner | H04W 4/80 |
| 2018/0349829 A1 | 12/2018 | Peterson | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0014070 A1 | 1/2019 | Mertvetsov | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0089581 A1 | 3/2019 | Purandare | |
| 2019/0095839 A1 | 3/2019 | Itabayashi | |
| 2019/0095846 A1 | 3/2019 | Gupta | |
| 2019/0102071 A1 | 4/2019 | Redkina | |
| 2019/0102364 A1* | 4/2019 | Rochiramani | G06F 40/166 |
| 2019/0102700 A1 | 4/2019 | Babu | |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |
| 2019/0147386 A1 | 5/2019 | Balakrishna | |
| 2019/0187987 A1 | 6/2019 | Fauchère | |
| 2019/0213509 A1 | 7/2019 | Burleson | |
| 2019/0265821 A1 | 8/2019 | Pearl | |
| 2019/0286462 A1 | 9/2019 | Bodnick | |
| 2019/0318285 A1 | 10/2019 | Sebilleau | |
| 2019/0340296 A1 | 11/2019 | Cunico | |
| 2019/0340518 A1 | 11/2019 | Merrill | |
| 2019/0340554 A1 | 11/2019 | Dotan-Cohen | |
| 2019/0340574 A1 | 11/2019 | Ekambaram | |
| 2019/0347094 A1 | 11/2019 | Sullivan | |
| 2019/0347126 A1 | 11/2019 | Bhandari | |
| 2019/0347515 A1* | 11/2019 | Kehl | G06F 18/23 |
| 2019/0370320 A1 | 12/2019 | Kalra | |
| 2020/0005241 A1 | 1/2020 | Westwood | |
| 2020/0019907 A1 | 1/2020 | Notani | |
| 2020/0059539 A1 | 2/2020 | Wang | |
| 2020/0065736 A1 | 2/2020 | Relangi | |
| 2020/0145239 A1 | 5/2020 | Ghods | |
| 2020/0162315 A1 | 5/2020 | Siddiqi | |
| 2020/0192538 A1 | 6/2020 | Karpe | |
| 2020/0192908 A1 | 6/2020 | Smith | |
| 2020/0193556 A1 | 6/2020 | Jin | |
| 2020/0218551 A1 | 7/2020 | Sabo | |
| 2020/0228474 A1* | 7/2020 | Cameron | H04L 51/04 |
| 2020/0233879 A1 | 7/2020 | Papanicolaou | |
| 2020/0244611 A1 | 7/2020 | Rosenstein | |
| 2020/0328906 A1 | 10/2020 | Raghavan | |
| 2020/0344253 A1 | 10/2020 | Kurup | |
| 2021/0004380 A1 | 1/2021 | Koch | |
| 2021/0004381 A1 | 1/2021 | Smith | |
| 2021/0035069 A1 | 2/2021 | Parikh | |
| 2021/0049555 A1 | 2/2021 | Shor | |
| 2021/0073697 A1 | 3/2021 | Paranjape | |
| 2021/0097466 A1 | 4/2021 | Sabo | |
| 2021/0097490 A1 | 4/2021 | Ratcliff | |
| 2021/0103451 A1 | 4/2021 | Sabo | |
| 2021/0110347 A1 | 4/2021 | Khalil | |
| 2021/0133162 A1 | 5/2021 | Arnold | |
| 2021/0136012 A1 | 5/2021 | Barbitta | |
| 2021/0141996 A1 | 5/2021 | Agrawal | |
| 2021/0149925 A1 | 5/2021 | Mann | |
| 2021/0157978 A1 | 5/2021 | Haramati | |
| 2021/0182475 A1 | 6/2021 | Pelz | |
| 2021/0209239 A1* | 7/2021 | Robinson | G06F 21/6209 |
| 2021/0209535 A1 | 7/2021 | Tezak | |
| 2021/0216562 A1 | 7/2021 | Smith | |
| 2021/0232282 A1 | 7/2021 | Karpe | |
| 2021/0248304 A1 | 8/2021 | Olivier | |
| 2021/0320891 A1 | 10/2021 | Rosenstein | |
| 2021/0342361 A1 | 11/2021 | Radzewsky | |
| 2021/0342785 A1 | 11/2021 | Mann | |
| 2021/0342786 A1 | 11/2021 | Jiang | |
| 2021/0382734 A1 | 12/2021 | Rosenstein | |
| 2022/0019320 A1 | 1/2022 | Sabo | |
| 2022/0019959 A1 | 1/2022 | Roy | |
| 2022/0029886 A1 | 1/2022 | Hameiri | |
| 2022/0053334 A1 | 2/2022 | Joshi | |
| 2022/0058548 A1 | 2/2022 | Garg | |
| 2022/0075792 A1 | 3/2022 | Koch | |
| 2022/0078142 A1 | 3/2022 | Cameron | |
| 2022/0101235 A1 | 3/2022 | Khalil | |
| 2022/0158859 A1 | 5/2022 | Raghavan | |
| 2022/0215315 A1 | 7/2022 | Sabo | |
| 2022/0391921 A1 | 12/2022 | Wilner | |
| 2023/0214509 A1 | 7/2023 | Kahawala | |
| 2023/0252415 A1 | 8/2023 | Ackerman-Greenberg | |
| 2023/0267419 A1 | 8/2023 | Beauchamp | |
| 2023/0306370 A1 | 9/2023 | Clifton | |
| 2023/0343027 A1* | 10/2023 | Cazamias | G06F 3/04842 |
| 2024/0013153 A1 | 1/2024 | Jiang | |
| 2024/0019993 A1* | 1/2024 | Rosenstein | G06F 9/451 |
| 2024/0171621 A1* | 5/2024 | Ye | H04L 65/402 |
| 2024/0220930 A1 | 7/2024 | Clifton | |
| 2024/0310990 A1 | 9/2024 | Beauchamp | |
| 2024/0346449 A1 | 10/2024 | Beauchamp | |
| 2024/0386382 A1 | 11/2024 | Adams | |

FOREIGN PATENT DOCUMENTS

| | | | |
|---|---|---|---|
| CN | 102378975 B | 5/2015 | |
| JP | 3973263 B2 * | 9/2007 | G06F 3/0481 |
| JP | 2008059035 A | 3/2008 | |
| JP | 4315508 B2 * | 8/2009 | G06F 3/04883 |
| JP | 4335340 B2 * | 9/2009 | G06Q 10/109 |
| WO | 2007064690 A2 | 6/2007 | |
| WO | 2015029073 A2 | 3/2015 | |
| WO | 2015036817 A1 | 3/2015 | |
| WO | 2015123751 A1 | 8/2015 | |
| WO | 2016115621 A1 | 7/2016 | |
| WO | 2020006634 A1 | 1/2020 | |

OTHER PUBLICATIONS

Tsung-Yi Chen, Yuh-Min Chen, Hui-Chuan Chu, Developing a trust evaluation method between co-workers in virtual project team for enabling resource sharing and collaboration, Computers in Industry, vol. 59, Issue 6. (Year: 2008) 15 pages.

N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.

"U.S. Appl. No. 14/584,750, Examiner Interview Summary mailed Feb. 25, 2016", 3 pgs.

(56) References Cited

OTHER PUBLICATIONS

"U.S. Appl. No. 14/584,750, Non Final Office Action mailed Aug. 28, 2015", 21 pgs.
"U.S. Appl. No. 14/584,750, Notice of Allowance mailed Mar. 28, 2016", 8 pgs.
"U.S. Appl. No. 14/584,750, Response filed Feb. 29, 2015 to Non Final Office Action mailed Aug. 28, 2015", 16 pgs.
"U.S. Appl. No. 14/584,850, Final Office Action mailed Sep. 1, 2017", 31 pgs.
"U.S. Appl. No. 14/584,850, Non Final Office Action mailed Jan. 10, 2017", 9 pgs.
"U.S. Appl. No. 14/584,850, Response filed Apr. 10, 2017 to Non Final Office Action mailed Jan. 10, 2017", 13 pgs.
"How to Asana: Inviting teammates to Asana." YouTube, Asana, Mar. 21, 2017, https://www.youtube.com/watch?v=TLOruY1KyxU (Year: 2017), 13 pages.
"Rules of Data Conversion from Document to Relational Databases", published: 2014, publisher: Future-processing, pp. 1-8 (Year: 2014).
(Tiburca, Andrew) Best Team Calendar Applications for 2018—Toggl https://toggl.com/blog/best-team-calendar-applications-for-2018 (Year: 2017).
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).
Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTVVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w816KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).

(56) References Cited

OTHER PUBLICATIONS

Klipfoliio. "What is a Project Management Dashboard?". Jan. 18, 2021. <https://web.archive.org/web/20210128061955/https://www.klipfolio.com/resources/articles/project-management-dashboard> (Year: 2021) 6 pages.
ASANA website; Mar. 12, 2020(https://web.archive.org/web/20200312140636/https://asana.com/guide/help/)(see attached pdf for sublinks) (Year: 2020).
N. S. Jyothi and A. Parkavi, "A study on task management system," 2016 International Conference on Research Advances in Integrated Navigation Systems (RAINS), Bangalore, India, 2016, pp. 1-6, doi: 10.1109/RAINS.2016.7764421. (Year: 2016).
Booch, Grady, and Alan W. Brown. "Collaborative development environments." Adv. Comput. 59.1 (2003): 1-27. (Year: 2003).
Heerwagen, Judith H., et al. "Collaborative knowledge work environments." Building research & information 32,6 (2004): 510-528. (Year: 2004).
Luff, Paul, Christian Heath, and David Greatbatch. "Tasks-in-interaction: paper and screen based documentation in collaborative activity." Proceedings of the 1992 ACM conference on Computer-supported cooperative work. 1992. (Year: 1992).

\* cited by examiner

SYSTEMS AND METHODS TO CHARACTERIZE WORK UNIT RECORDS OF A COLLABORATION ENVIRONMENT BASED ON FREEFORM ARRANGEMENT OF VISUAL CONTENT ITEMS

FIELD OF THE DISCLOSURE

The present disclosure relates to systems and methods to characterize work unit records of a collaboration environment based on freeform arrangement of visual content items representing the work unit records, in particular, by translating collective spatial arrangements of the visual content items into homogenized changes to sets of the work unit records.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. A way that operators look to improve the operation of the collaboration environment is to improve parts of the collaboration environment involving substantial human-machine interaction and/or parts that fall short of providing intuitive experiences for the users. For example, records for work are typically generated manually by inputting one or more of a title, assignee, collaborators, dependencies, project association, team association, and/or other fields directly into an appropriate text input box within a user interface. If there is a need to create and/or modify multiple work items at once, a user may have to switch between different views or pages of a user interface to access the fields for each individual work item. There has yet to be a user interface that allows for multiple items of work to be collectively assessed/managed, while providing a mechanism to intuitively define one or more fields for the collective work all at once.

To address these and/or other problems, one or more implementations presented herein propose a technique to characterize work unit records of a collaboration environment based on freeform arrangement of visual content items. A specially configured user interface including a digital space is provided where users freely move and position visual content items representing their work. Users may intuitively position visual content item in a manner that defines some relationships between the underlying work. By way of non-limiting illustration, a collection of visual content item within an arrangement may inform the system of relatedness of the underlying work. This may include, for example, adding the underlying work for the collection of the visual content items to a common project. By way of non-limiting illustration, a collection of visual content item forming a row arrangement may inform the system of some temporal aspects of the underlying work. By way of non-limiting illustration, aligning a collection of visual content items in a row from left to right may dictate a desired temporal order of due dates for the underlying collection of work. In short, the resulting spatial arrangements of collections of the visual content item may unlock functionality that may be applied to the underlying work. A user's freeform arrangement of the visual content item within a collection may result in modification of multiple work all at once, via this single user interface.

These, along with other features and/or functionality presented herein, may be recognized by persons of ordinary skill in the art as providing improvements upon the operation of a collaboration environment including, among others, increased efficiency and accuracy in the creation and management of records and/or the information making up the records of the collaboration environment.

One or more implementations of a system configured to characterize work unit records of a collaboration environment based on freeform arrangement of visual content items may include one or more hardware processors configured by machine-readable instructions and/or other components. Executing the machine-readable instructions may cause the one or more hardware processors to facilitate characterizing work unit records of a collaboration environment based on freeform arrangement of visual content items. The machine-readable instructions may include one or more computer program components. The one or more computer program components may include one or more of an environment state component, a user interface component, an arrangement component, and/or other components.

The environment state component may be configured to manage environment state information maintaining a collaboration environment. The collaboration environment may be configured to facilitate interaction by users with the collaboration environment. The environment state information may include one or more records. The one or more records may include user records, work unit records, and/or other information. The work unit records may define units of work managed, created, and/or assigned within the collaboration environment. The work unit records may specify values of work unit parameters characterizing the units of work. The work unit records may include one or more of a first work unit record for a first unit of work, a second work unit record for a second unit of work, and/or other work unit records.

The user interface component may be configured to effectuate presentation of instances of a user interface of the collaboration environment on client computing platforms associated with the users. The user interface may be configured to receive user input defining positions of visual content items within the user interface. Individual visual content items may represent individual units of work. By way of non-limiting illustration, a visual content item may include an icon that includes a title, graphic, or summary of the work it represents. The user interface may be configured to display the visual content items at positions defined by the user input in an arrangement of the visual content items. By way of non-limiting illustration, the user interface may be presented on a first client computing platform of a first user. The user interface on the first client computing platform may display one or more of a first visual content item representing the first work unit record at a first position defined by the user input for the first visual content item, a second visual content item representing the second work unit record at a second position defined by the user input for the second visual content item, and/or other visual content items representing other work unit records.

The arrangement component may be configured to obtain arrangement information for collections of the visual content items displayed in the user interface. The arrangement information may characterize spatial arrangements of the collections of the visual content items as displayed in the user interface. By way of non-limiting illustration, the arrangement component may obtain first arrangement information characterizing a first spatial arrangement of a collection of one or more of the first visual content item, the second visual content item, and/or other visual content items displayed on the user interface on the first client computing platform.

The environment state component may be configured to modify, based on the arrangement information and/or other information, one or more of the values of one or more of the work unit parameters for one or more of the work unit records represented by the collections of the visual content items. By way of non-limiting illustration, a first value of a first work unit parameter of the first work unit record may be modified based on the first spatial arrangement.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
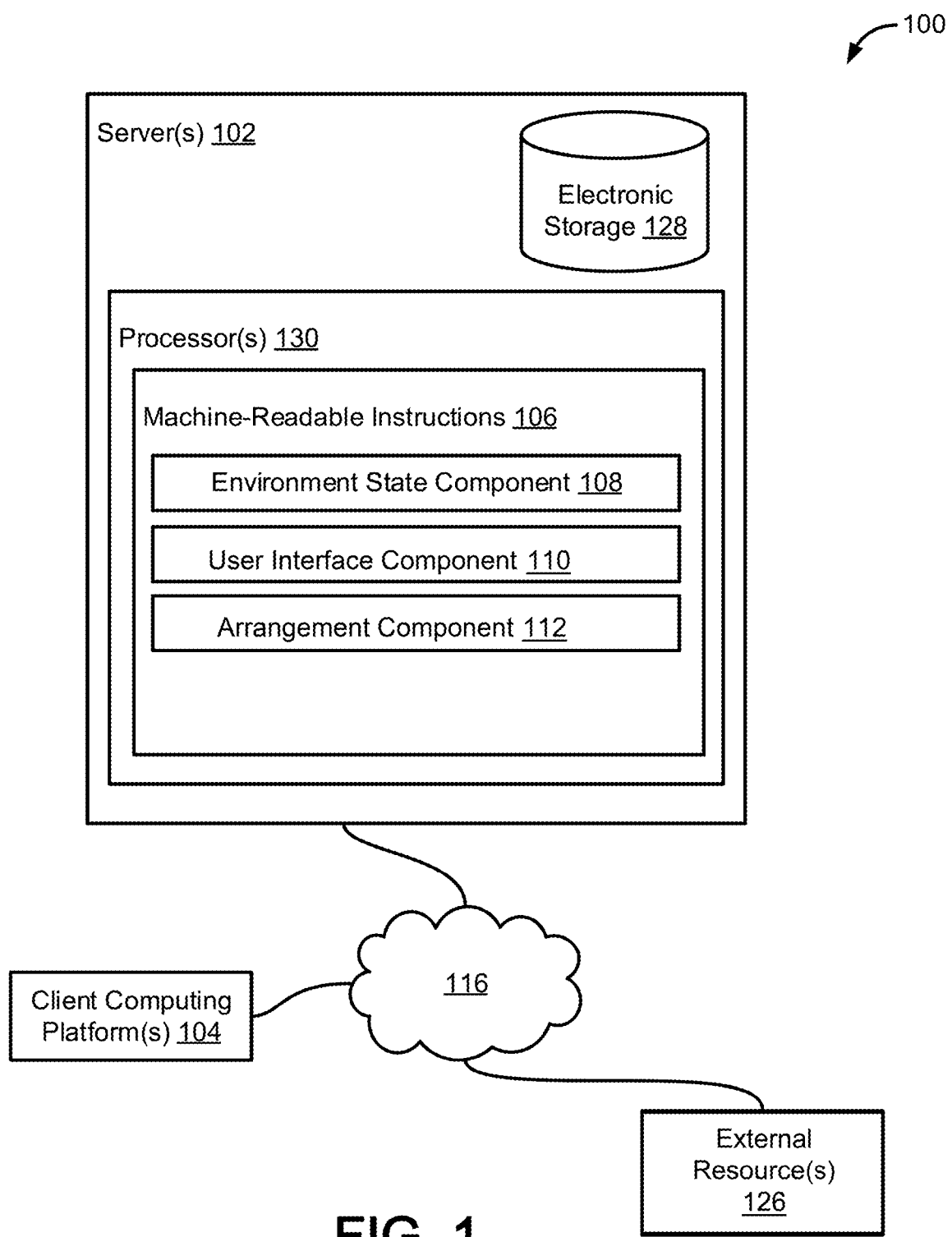
FIG. 1 illustrates a system configured to characterize work unit records of a collaboration environment based on freeform arrangement of visual content items, in accordance with one or more implementations.

FIG. 1 illustrates a system 100 configured to characterize work unit records of a collaboration environment based on freeform arrangement of visual content items, in accordance with one or more implementations. A collection of visual content item within an arrangement may inform the system of relatedness of underlying work. The relatedness may translate into one or more homogenous changes to the information defining the underlying work within one or more work unit records.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate characterizing work unit records of a collaboration environment based on freeform arrangement of visual content items. The computer program components may include one or more of an environment state component 108, user interface component 110, an arrangement component 112, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, and/or other records. The user records may include user information describing the users of the collaboration environment. The work unit records which may include work information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

The work information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Units of work may be created by a given user for the given user and/or created by the given user and assigned to one or more other users. Units of work may be created by a given user for the given user and/or created by the given user and managed by one or more other users. Tasks may include to-do items and/or action items one or more users should accomplish and/or plan on accomplishing in order to complete a task. Individual units of work may include and/or may be associated with one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), stage, and/or other information.

In some implementations, work unit parameters may include one or more of a work assignment parameter, work completion parameter, a work management parameter, work creation parameter, dependency parameter, grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information. The values of the stage parameter may characterize stage of individual ones of the units of work within workflows.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

In some implementations, environment state component 108 may be configured to manage information defining work unit pages (sometimes referred to simply as "pages") corresponding to the individual units of work. Individual work unit pages may provide access to individual units of work and/or their records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages.

In some implementations, work unit records may define projects. The projects may be defined by project information and/or other information. Project information may include values of work unit parameters for projects managed within the collaboration environment. The work unit parameters for projects may be referred to as "project parameters." The work unit parameters comprising project parameters may be specific to projects and may include one or more parameters not shared with tasks and/or objectives. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. Objectives may be defined by objective information including values of one or more work unit parameters. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify individual roles of the individual users. A role may represent a position of an individual user. The position may be specified based on a description of one or more of a job title, level, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work. The roles may convey expected contribution of the users in completing and/or supporting the units of work. The individual roles of individual users within some units of work (e.g., a task) may be specified separately from the individual roles of the individual users within other units of work (e.g., a project associated with the task). The individual roles of individual users within the units of work may be specified separately from the individual roles of the individual users within a business organization as a whole.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The user interface component 110 may be configured to effectuate presentation of instances of a user interface of the collaboration environment on client computing platform(s) 104 of the user. The user interface may provide one or more views of the collaboration environment and/or provide other features and/or functionality. The one or more views may include one or more pages of the collaboration environment and/or other views. In some implementations, an individual view of the collaboration environment may textually and/or graphically display information from one or more of a user record, a work unit record, and/or other information. By way of non-limiting illustration, a view may display one or more of a work unit page, a queue of units of work, a digital space allowing freeform arrangement of visual content item, and/or other information.

In some implementations, user interface component 110 may be configured to effectuate presentation of instances of a user interface of the collaboration environment through which visual content items representing work unit records are instantiated into a digital space and/or positioned based on user input. Instantiation into the digital space may be accomplished through drag-and-drop input and/or other mechanisms of user input that cause individual visual content item to appear in the digital space.

The user interface may include one or more user interface portions. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, and/or other elements configured to facilitate user interaction.

The user interface may be configured to receive user input defining positions of visual content items within a user interface. Individual visual content items may represent individual units of work. By way of non-limiting illustration, a visual content item may include an icon that includes a title, graphic, summary, and/or other information related to the work it represents. The user interface may be configured to display the visual content items at the positions defined by the user input in an arrangement of the visual content items.

In some implementations, a digital space through which visual content items are instantiated and/or positioned may include one or more of a window of the user interface, or portion of a user interface, and/or other displays configured to facilitate positioning of visual content items therein. The digital space may be devoid of predetermined positions where visual content item may (or must) be positioned. In other words, the digital space may be an "open" space where visual content item may be positioned without restrictions, other than the bounds of the space itself. This may differ from other user interfaces that may be configured to "snap" (e.g., automatically position) icons into one or more predetermined positions upon bringing the icons at or near the individual predetermined positions. Thus, users may utilize the digital space for uninhibited, freeform, positioning of visual content item therein.

In some implementations, position may refer to a point (or set of points) on which a visual content item may sit. The positioning of a visual content item in the digital space may define an absolute position of the visual content item within to the digital space as a whole. The digital space may have degrees of freedom in two dimensions and/or other amounts of dimensions. The digital space may define one or more of an area, a volume, and/or other spaces. In some implementations, a coordinate system may be established within the digital space so that absolute position of visual content item within the area may be derived and/or measured.

The digital space may form a coordinate plane. The digital space may define a rectangular plane, circular plane, and/or other shape. A rectangular plane may have a length dimension and a height dimension. Within a coordinate system for a rectangle, a first axis may correspond to a length dimension, and a second axis may correspond to a height dimension. The first axis and the second axis may intersect at an origin of the coordinate system. In some implementations, for a rectangular space, the origin may comprise a corner (e.g., bottom left corner) of the coordinate plane, the first axis may comprise what is typically referred to as an "x-axis" and the second axis may comprise what is typically referred as a "y-axis." In some implementations, to locate a visual content item on the coordinate plane, ordered pairs of values may be used where the ordered pair is written as (x-coordinate, y-coordinate) or (x, y), where x-coordinate represents a point on the x-axis or perpendicular distance from the y-axis and y-coordinate represents a point on the y-axis or perpendicular distance from the x-axis. The axes may measure units of distance, such that the origin starts at "zero" and the terminating end of the axis marks the bounds of the digital space and farthest distance from the origin in each direction. The units of distance may include one or more of pixels, inches, centimeters, and/or other units of distance. In some implementations, the coordinate system may or may not be visible in the digital space as it appears within the user interface on the computing platforms of the users. In some implementations, the position of a visual content item may be measured from a center point of the visual content item.

Although a rectangular coordinate system is described above, this is for illustrative purposes only. Instead, those skilled in the art may appreciate that the digital space may take on other shapes and/or may have coordinate systems defined in other ways. By way of non-limiting illustration, a polar coordinate system may be utilized for a circle-shaped digital space.

In some implementations, the digital space may include, and/or may be accompanied, by a display window including visual content items representing work unit records available to be positioned in the digital space. The display window may define a portion of the user interface from which visual content items may be selected, to thereafter by instantiated into the digital space itself, and positioned as desired by the user. In some implementations, the user interface may utilize drag-and-drop input and/or other input as a mechanism to move visual content item from the display window to the digital space. In some implementations, the display window may include a search bar (including a text input field) where users may search for other work unit records. A list of results from a search may be presented in a pop-up window and/or drop-down menu. The results may include text results that show titles for the searched—for work unit records. Upon selection of a result, a new visual content item representing a work unit record may be presented in the display window, and thereafter be made available to move into the digital space.

By way of non-limiting illustration, the user interface may be presented on a first client computing platform of a first user. The user interface on the first client computing platform may display a collection of visual content items including one or more of a first visual content item representing the first work unit record at a first position defined by user input for the first visual content item, a second visual content item representing the second work unit record at a second position defined by user input for the second visual content item, and/or other visual content items representing other work unit records.

The arrangement component 112 may be configured to obtain arrangement information for collections of the visual content items displayed in the user interface. The arrangement information may characterize spatial arrangements of collections of the visual content items positioned by the users and displayed in the user interface. The spatial arrangements of the visual content items may be characterized by one or more of absolute position of the individual visual content items, relative position of the individual visual content items, and/or other information.

Absolute position may be measured with respect to an origin of a coordinate system of the digital space. By way of non-limiting illustration, as mentioned above, absolution position may be expressed as ordered pairs of values where the ordered pair is written as (x-coordinate, y-coordinate) or (x, y), where x-coordinate represents a point on an x-axis or perpendicular distance from a y-axis and y-coordinate represents a point on the y-axis or perpendicular distance from an x-axis.

Relative position may include measures derived from absolution positions of multiple visual content item. In some implementations, relative position include measures such as one or more of proximity between two or more visual content items, directional ordering of two or more visual content items.

Proximity may comprise a measure to determine grouping or clustering arrangement of visual content item. Proximity may be measured as straight line distance between center points, edges, other portions of visual content item, and/or other points within the digital space. In some implementations, proximity between visual content item may be compared against a threshold proximity. When proximity is at or within the threshold proximity, a grouping or clustering of visual content items may be inferred. When considering a set of more than two visual content items, an imaginary center point of the set may be determined. The proximity of the visual content items to the center point may be the proximity measure that determines whether the visual content items in the set form a group cluster. If a proximity to a center point of a visual content item falls below the threshold proximity, the visual content item may not be considered a group with other visual content item having proximity to a center point that is at or below the threshold proximity.

A directional ordering arrangement may take into account positioning of multiple visual content items alone a common axis. For example, positioning of visual content items may be compared to determine whether they are aligned commonly alone a perpendicular line extending from an axis. For example, with respect to a rectangular plane, visual content items may be aligned vertically in a columnar arrangement, or horizontally in a row arrangement. With respect to direction, it may be assumed that one direction along an axis may be ascending, while the other may be descending. By way of non-limiting illustration, a direction of left to right may convey an ordering that starts on the left (e.g., left is the start) and ends on the right (e.g., right is the end). By way of non-limiting illustration, a direction of top to bottom may convey an ordering that starts on the top (e.g., top is the start) and ends on the bottom (e.g., bottom is the end).

By way of non-limiting illustration, the arrangement component 112 may obtain first arrangement information characterizing a first spatial arrangement of a collection comprising one or more of the first visual content item, the second visual content item, and/or other visual content items displayed on the user interface on the first client computing platform. The first spatial arrangement may be characterized by one or more of a first absolute position of the first visual content item, a first relative position of the first visual content item with respect to the second visual content item, a second absolute position of the second visual content item, and/or other information.

The environment state component 108 may be configured to create and/or modify, based on the arrangement information and/or other information, one or more records. By way of non-limiting illustration, one or more of values of one or more work unit parameters for one or more work unit records represented by the visual content items may be modified. By way of non-limiting illustration, one or more of values of one or more work unit parameters for one or more other work unit records may be created. In some implementations, new work unit records may be created. In some implementations, modification to records and/or creation of records may be carried out automatically in response (e.g., instantly and/or after a period of time) to determining on the arrangement information and/or other information. In some implementations, modification to records and/or creation of records may be carried out in response to obtaining further user input.

In some implementations, modifications to work unit records may include homogenous changes to one or more values. Homogenous changes may mean that the values of parameters for a set of work unit records represented by a set of visual content item in a collection are changed in the same, or similar, manner.

In some implementations, spatial arrangements of collections of visual content item may correspond to certain modifications to, and/or creation of, one or more work unit records. By way of non-limiting illustration, proximity may convey relatedness in the form of values of a grouping parameter. That is, when a set of visual content items are determined to be proximate (e.g., proximity is at or within a threshold), then the values of the grouping parameter for the underlying work unit records may be changed to reflect inclusion in a common project (or team, objective, or other group). In some implementations, this may further cause a new work unit object (e.g., a project, objective, team) to be created as a basis for the commonality. In some implementations, the common project (or other group) may be selected from a project that one of the work unit records represented by the visual content items may already be a part of. By way of non-limiting illustration, a centermost visual content item may represent a work unit record that is part of an existing group. When other visual content items are clustered around that visual content item, the work unit records of the other visual content items may be modified to also reflect inclusion in the existing group.

By way of non-limiting illustration, directional ordering may convey relatedness in dates (due dates, start dates, end date, etc.). That is, when a set of visual content items are determined to have a directional ordering (e.g., aligned vertically or horizontally), then the values of a date parameter for the underlying work unit records may be changed to reflect the directional ordering. The directional ordering may be associated with a sequential order of dates. Upon identifying the direction order, the dates of the work unit records may be changed to follow the sequential order. For example, a directional order of visual content items from left to right may convey a desired timeline for completion of the underlying work, where the leftmost visual content item conveys an earliest date, and the rightmost visual content item conveys a later date. In some implementations, a sequential order of dates may include successive dates, dates spread out by a predetermined duration (e.g., dates that are two weeks apart), and/or other specifications. Some of these characteristics may be specified by a user ahead of time.

By way of non-limiting illustration, directional ordering may convey relatedness in dependency. That is, when a set of visual content items are determined to have a direction ordering (e.g., aligned vertically or horizontally), then the values of a dependency parameter for the underlying work unit records may be changed to reflect the directional ordering. The directional ordering may be associated with a hierarchy. Upon identifying the directional ordering, the dependency of the underlying work unit records may changed to follow the hierarchy. For example, a directional order of visual content items from top to bottom may convey a desired hierarchy, where the topmost visual content item conveys a highest order within the hierarchy, and the bottommost visual content item conveys a lowest order within the hierarchy. By way of non-limiting illustration, a columnar ordering of two visual content items may cause the work unit record associated with the bottom visual content item to be dependent on the work unit record associated with the top visual content item.

By way of non-limiting illustration, responsive to the relative position of two or more of the visual content items conveying proximity between the two or more of the visual content items is at or below a proximity threshold, environment state component 108 may be configured to homogenize the values of a given work unit parameter for the work unit records represented by the two or more of the visual content items. In some implementations, the given work unit parameter may comprise a grouping parameter such that homogenizing the values causes the work unit records to be associated with a common group.

By way of non-limiting illustration, responsive to the relative position of two or more of the visual content items conveying a directional ordering of the two or more of the visual content items, environment state component 108 may be configured to modify the values of a given work unit parameter for the work unit records represented by the two or more of the visual content items in accordance with the directional ordering. In some implementations, the given work unit parameter may be a due date parameter such that modifying the values for the work unit records represented by the two or more of the visual content items comprises setting the values to a sequential order of dates. In some implementations, the given work unit parameter may be a dependency parameter such that modifying the values for the work unit records represented by the two or more of the visual content items comprises setting the values to convey a hierachy of dependency.

In some implementations, one or more areas within the digital space may be pre-associated with one or more modifications. By way of non-limiting illustration, a user may trace out an area (e.g., a square in a corner of the space), and specify that visual content item placed within that area cause the underlying work unit records to be modified in a predetermined manner. The predetermined manner may include, for example, one or more of inclusion in a common group, assignment/reassignment to a particular user (or role), changing due date (e.g., pushing due date out two weeks, etc.). Other predetermined modifications may be designated for particular areas within the digital space.

In some implementations, responsive to the absolute position of the individual ones of the visual content items being within a predetermined area on the user interface, environment state component 108 may be configured to modify the values of a given work unit parameter for the work unit records represented by the individual ones of the visual content items within the predetermined area by a predetermined modification.

By way of non-limiting illustration, a first value of a first work unit parameter of the first work unit record may be modified based on the first spatial arrangement. In some implementations, responsive to the first relative position conveying the proximity between the first visual content item and the second visual content item is at or below a proximity threshold, the values of the first work unit parameter for one or both of the first work unit record and the second work unit record may be homogenized (e.g., set to the same value). In some implementations, responsive to the first relative position conveying a first directional ordering of the first visual content item and the second visual content item, the values of the first work unit parameter for one or both of the first work unit record and the second work unit record may be modified to reflect the first directional ordering. In some implementations, responsive to the first absolute position falling within a first predetermined area, the first value of the first work unit parameter may be modified in accordance with a first predetermined modification.

In some implementations, responsive to obtaining the arrangement information and prior to modifying the values by the environment state component 108, user interface component 110 may be configured to generate record modification notifications. The record modification notifications may convey recommendations to modify one or more of the values of the one or more of the work unit parameters based on the arrangement information and/or other information. The record modification notification may include user interface elements (e.g., virtual buttons) which, upon selection, allow a user to approve or deny the recommendation. Approval of the recommendation may cause changes to be carried out for the work unit records (or creations of new records) automatically and simultaneously.

The user interface component 110 may be configured to effectuate presentation of the record modification notifications on the client computing platform(s) 104 associated with the users. The record modification notifications may be presented as pop-windows, private messages, and/or other types of communications.

In some implementations, responsive to obtaining approval, via user input in the record modification notifications, environment state component 108 may be configured to execute the recommended modifications.

In some implementations, the arrangement component 112 may be configured to learn, for individual users and/or teams of users, associations between spatial arrangements of collections of visual content items and the modifications/creations that are derived therefrom. For example, using machine learning, heuristics, and/or other techniques, the arrangement component 112 may be configured to monitor work unit records for changes made manually by users after modifications have been made from the spatial arrangements. Based on those modifications, the arrangement component 112 may be configured to adapt what modifications and/or creations are made based on the arrangement information and/or other information. By way of non-limiting illustration, arrangement component 112 may be configured to initially correlate clustering of visual content item to grouping the underlying work in a common project. Based on subsequent monitoring of the underlying work, it may turn out that the user ends up changing the grouping to a common objective, as opposed to project. Thus, the arrangement component 112 may be adapted for that user to now correlate clustering of visual content item to grouping the underlying work in a common objective. Other adaptations may be made based on subsequent monitoring of the underlying work.

Figure 3:
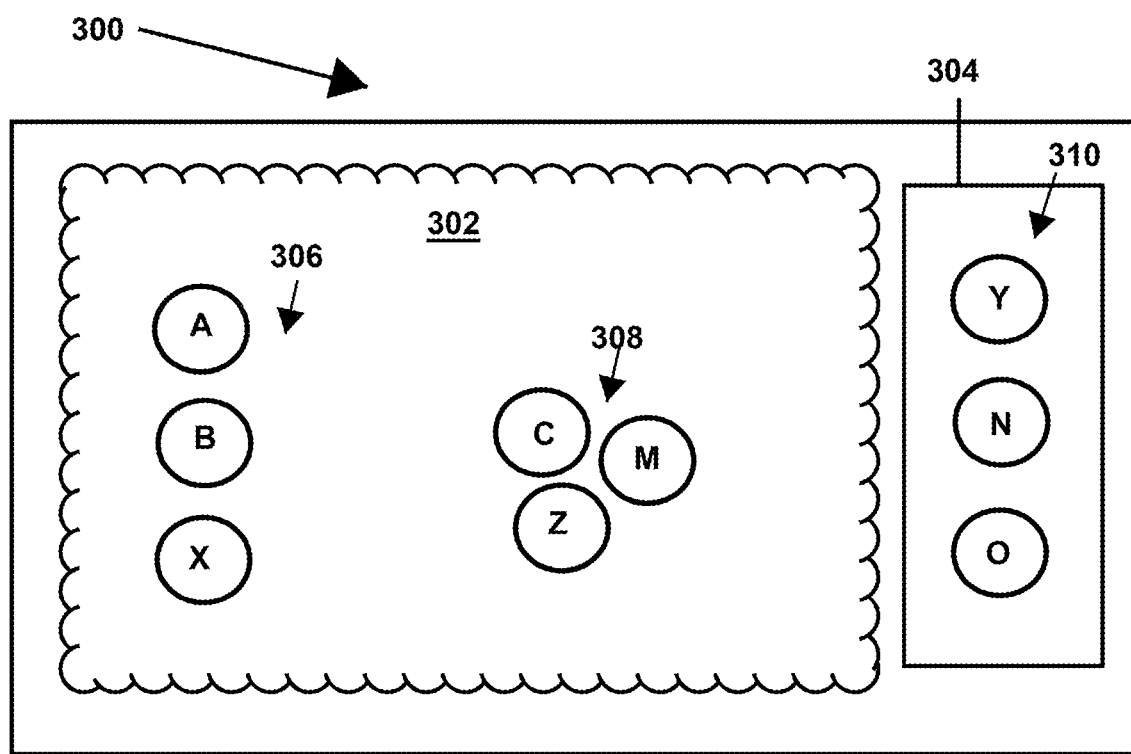
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a digital space 302 upon which visual content items may be positioned by user input. For illustrative purposes, the visual content items are presented by circular icons, labeled, A, B, C, M, N, O, X, Y, and Z. The user interface 300 may include a display window 304 displaying a set 310 of visual content items available to be added to the digital space 302. The individual visual content items may present individual units of work. The user interface 300 may display the visual content items at positions defined by the user input in an arrangement of a collection of the visual content items. Arrangement information may characterize spatial arrangement(s) of the collection of the visual content items as displayed in the user interface 300. By way of non-limiting illustration, upon user positioning, the collection of visual content items may be characterized by spatial arrangement(s) of a first set 306 of the visual content items (A, B, and X), and a second set 308 of the visual content items (C, M, and Z). The first set 306 may have directional ordering arrangement by virtue of the vertical alignment of the visual content items A, B, and X. The second set 308 may have a grouping or clustering arrangement by virtue of the proximity of visual content items C, M, and Z to one another. In some implementations, the directional ordering of visual content items A, B, and X may cause one or more values of one or more work unit parameters of the underlying work to be modified and/or created. By way of non-limiting illustration, a task associated with visual content item X may be made dependent on a task associated with visual content item B, which may be made dependent on a task associated with visual content item C. In some implementations, the clustering of visual content items C, M, and Z may cause one or more values of one or more work unit parameters of the underlying work to be modified and/or created. By way of non-limiting illustration, projects associated with visual content items C, M, and Z may be defined as supporting a common objective.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
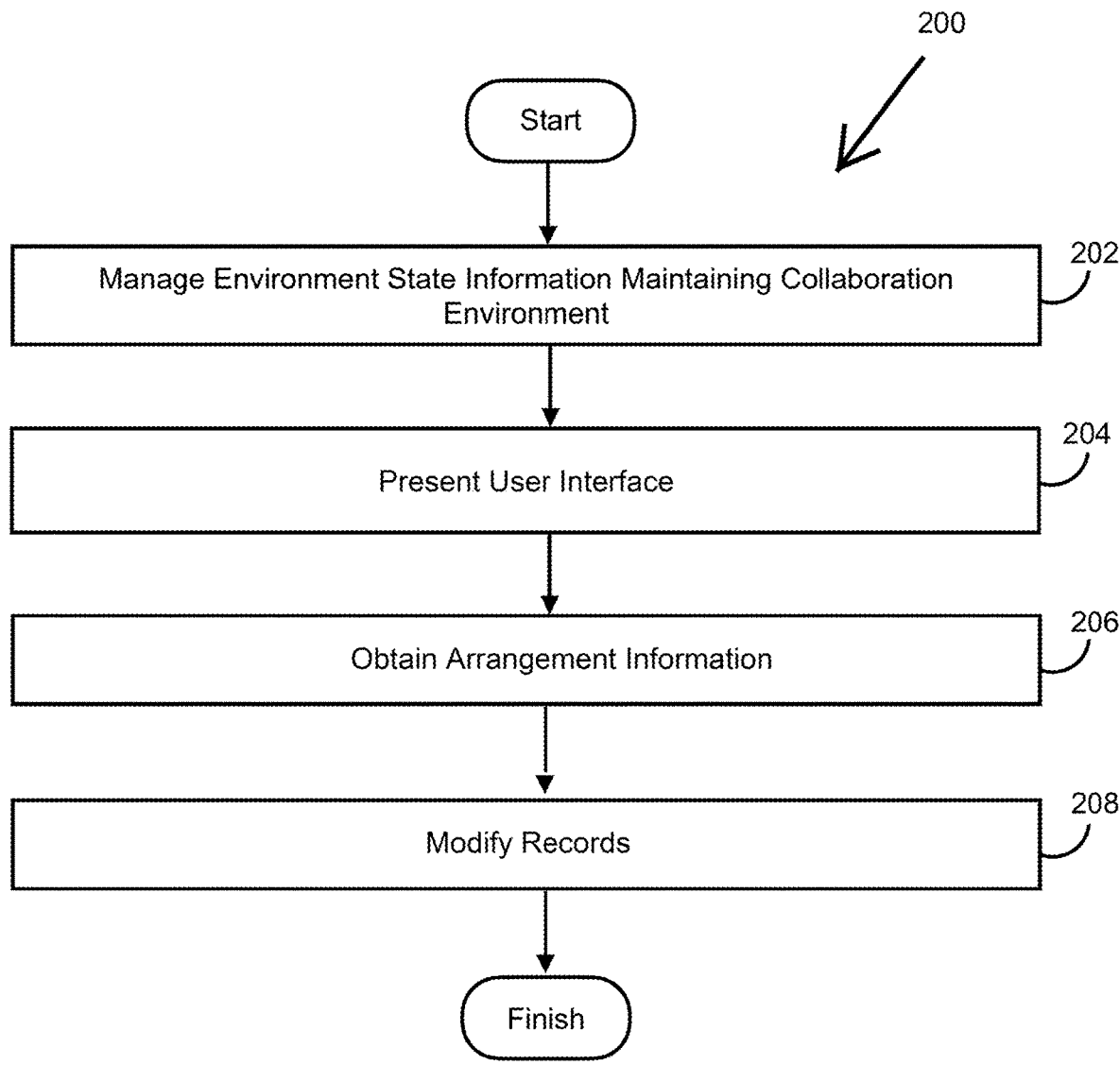
FIG. 2 illustrates a method to characterize work unit records of a collaboration environment based on freeform arrangement of visual content items, in accordance with one or more implementations.

FIG. 2 illustrates a method 200 to characterize work unit records of a collaboration environment based on freeform arrangement of visual content items, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more records. The one or more records may include user records, work unit records, and/or other information. The work unit records may define units of work managed, created, and/or assigned within the collaboration environment. The work unit records may specify values of work unit parameters characterizing the units of work. The work unit records may include one or more of a first work unit record for a first unit of work, a second work unit record for a second unit of work, and/or other work unit records. Operation 202 may be performed by one or more hardware processors configured by machine-readable instructions including a component that is the same as or similar to environment state component 108, in accordance with one or more implementations.

An operation 204 may effectuate presentation of instances of a user interface of the collaboration environment on client computing platforms associated with the users. The user interface may be configured to receive user input defining positions of visual content items within the user interface. Individual visual content items may represent individual units of work. By way of non-limiting illustration, a visual content item may include an icon that includes a title, graphic, or summary of the work it represents. The user interface may be configured to display the visual content items at positions defined by the user input in an arrangement of the visual content items. By way of non-limiting illustration, the user interface may be presented on a first client computing platform of a first user. The user interface on the first client computing platform may display one or more of a first visual content item representing the first work unit record at a first position defined by the user input for the first visual content item, a second visual content item representing the second work unit record at a second position defined by the user input for the second visual content item, and/or other visual content items representing other work unit records. Operation 204 may be performed by one or more hardware processors configured by machine-readable instructions including a component that is the same as or similar to user interface component 110, in accordance with one or more implementations.

An operation 206 may obtain arrangement information for collections of the visual content items displayed in the user interface. The arrangement information may characterize spatial arrangements of the collections of the visual content items as displayed in the user interface. By way of non-limiting illustration, the arrangement component may obtain first arrangement information characterizing a first spatial arrangement of a collection of one or more of the first visual content item, the second visual content item, and/or other visual content items displayed on the user interface on the first client computing platform. Operation 206 may be performed by one or more hardware processors configured by machine-readable instructions including a component that is the same as or similar to arrangement component 112, in accordance with one or more implementations.

An operation 208 may modify, based on the arrangement information and/or other information, one or more records. The modification may include modification of one or more of the values of one or more of the work unit parameters for one or more of the work unit records represented by the collections of the visual content items. By way of non-limiting illustration, a first value of a first work unit parameter of the first work unit record may be modified based on the first spatial arrangement. Operation 208 may be performed by one or more hardware processors configured by machine-readable instructions including a component that is the same as or similar to environment state component 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to characterize work unit records of a collaboration environment based on freeform arrangement of visual content items, the system comprising:
    one or more physical processors configured by machine-readable instructions to:
        manage environment state information maintaining a collaboration environment, the collaboration environment being configured to facilitate interaction by users with the collaboration environment, the environment state information including work unit records for units of work managed, created, and/or assigned within the collaboration environment, the work unit records specifying values of work unit parameters characterizing the units of work, the work unit records including a first work unit record for a first unit of work, and a second work unit record for a second unit of work;
        effectuate presentation of instances of a user interface of the collaboration environment on client computing platforms associated with the users, the user interface being configured to receive user input defining positions of visual content items within the user interface, individual visual content items representing individual units of work, and to display the visual content items at the positions defined by the user input in an arrangement of the visual content items, such that the user interface is presented on a first client computing platform of a first user and displays a first visual content item representing the first work unit record at a first position defined by the user input for the first visual content item, and a second visual content item representing the second work unit record at a second position defined by the user input for the second visual content item;
        obtain arrangement information for the visual content items displayed in the user interface, the arrangement information characterizing spatial arrangements of collections of the visual content items as displayed in the user interface, such that first arrangement information characterizes a first spatial arrangement of a first collection comprising the first visual content item and the second visual content item; and
        modify, based on the arrangement information, one or more of the values of one or more of the work unit parameters for one or more of the work unit records represented by the collections of the visual content items, such that a first value of a first work unit parameter of the first work unit record is modified based on the first spatial arrangement.

2. The system of claim 1, wherein the spatial arrangements of the collections of the visual content items are characterized by absolute position of the individual visual content items and relative position of the individual visual content items, such that the first spatial arrangement is characterized by a first absolute position of the first visual content item, a first relative position of the first visual content item with respect to the second visual content item, and a second absolute position of the second visual content item.

3. The system of claim 2, wherein the one or more physical processors are further configured by the machine-readable instructions to:
    responsive to the relative position of two or more of the visual content items conveying proximity between the two or more of the visual content items is at or below a proximity threshold, homogenize the values of a given work unit parameter for the work unit records represented by the two or more of the visual content items, such that:
    responsive to the first relative position conveying the proximity between the first visual content item and the second visual content item is at or below the proximity threshold, homogenize the values of the first work unit parameter for both the first work unit record and the second work unit record.

4. The system of claim 3, wherein the given work unit parameter is a grouping parameter such that homogenizing the values causes the work unit records to be associated with a common group.

5. The system of claim 2, wherein the one or more physical processors are further configured by the machine-readable instructions to:
    responsive to the relative position of two or more of the visual content items conveying a directional ordering of the two or more of the visual content items, modify the values of a given work unit parameter for the work unit records represented by the two or more of the visual content items in accordance with the directional ordering, such that:

responsive to the first relative position conveying a first directional ordering of the first visual content item and the second visual content item, modify the values of the first work unit parameter for both the first work unit record and the second work unit record based on the first directional ordering.

6. The system of claim 5, wherein the given work unit parameter is a due date parameter such that modifying the values for the work unit records represented by the two or more of the visual content items comprises setting the values to a sequential order of dates.

7. The system of claim 2, wherein the one or more physical processors are further configured by the machine-readable instructions to:
responsive to the absolute position of the individual visual content items being within a predetermined area on the user interface, modify the values of a given work unit parameter for the work unit records represented by the individual visual content items within the predetermined area by a predetermined modification, such that:
responsive to the first absolute position falling within a first predetermined area, modify the first value of the first work unit parameter in accordance with a first predetermined modification.

8. The system of claim 1, wherein the one or more physical processors are further configured by the machine-readable instructions to:
responsive to obtaining the arrangement information and prior to modifying the values, generate record modification notifications, the record modification notifications conveying recommendations to modify the one or more of the values of the one or more of the work unit parameters based on the arrangement information;
effectuate presentation of the record modification notifications on the client computing platforms associated with the users; and
responsive to obtaining approval, via further user input in the record modification notifications, execute modifications of the one or more of the values of the one or more of the work unit parameters based on the arrangement information.

9. The system of claim 1, wherein the user interface comprises a digital space that is part of the collaboration environment through which the visual content items representing the work unit records are instantiated into the digital space and positioned based on the user input.

10. The system of claim 9, wherein instantiation into the digital space is accomplished through drag-and-drop input.

11. A method to characterize work unit records of a collaboration environment based on freeform arrangement of visual content items, the method comprising:
managing environment state information maintaining a collaboration environment, the collaboration environment being configured to facilitate interaction by users with the collaboration environment, the environment state information including work unit records for units of work managed, created, and/or assigned within the collaboration environment, the work unit records specifying values of work unit parameters characterizing the units of work, the work unit records including a first work unit record for a first unit of work, and a second work unit record for a second unit of work;
effectuating presentation of instances of a user interface of the collaboration environment on client computing platforms associated with the users, the user interface being configured to receive user input defining positions of visual content items within the user interface, individual visual content items representing individual units of work, and to display the visual content items at the positions defined by the user input in an arrangement of the visual content items, including presenting the user interface on a first client computing platform of a first user and displaying a first visual content item representing the first work unit record at a first position defined by the user input for the first visual content item, and a second visual content item representing the second work unit record at a second position defined by the user input for the second visual content item;
obtaining arrangement information for the visual content items displayed in the user interface, the arrangement information characterizing spatial arrangements of collections of the visual content items as displayed in the user interface, including obtaining first arrangement information characterizing a first spatial arrangement of a first collection comprising the first visual content item and the second visual content item; and
modifying, based on the arrangement information, one or more of the values of one or more of the work unit parameters for one or more of the work unit records represented by the collections of the visual content items, including modifying a first value of a first work unit parameter of the first work unit record based on the first spatial arrangement.

12. The method of claim 11, wherein the spatial arrangements of the collections of the visual content items are characterized by absolute position of the individual visual content items and relative position of the individual visual content items, such that the first spatial arrangement is characterized by a first absolute position of the first visual content item, a first relative position of the first visual content item with respect to the second visual content item, and a second absolute position of the second visual content item.

13. The method of claim 12, further comprising:
responsive to the relative position of two or more of the visual content items conveying proximity between the two or more of the visual content items is at or below a proximity threshold, homogenizing the values of a given work unit parameter for the work unit records represented by the two or more of the visual content items, including:
responsive to the first relative position conveying the proximity between the first visual content item and the second visual content item is at or below the proximity threshold, homogenizing the values of the first work unit parameter for both the first work unit record and the second work unit record.

14. The method of claim 13, wherein the given work unit parameter is a grouping parameter such that homogenizing the values causes the work unit records to be associated with a common group.

15. The method of claim 12, further comprising:
responsive to the relative position of two or more of the visual content items conveying a directional ordering of the two or more of the visual content items, modifying the values of a given work unit parameter for the work unit records represented by the two or more of the visual content items in accordance with the directional ordering, including:
responsive to the first relative position conveying a first directional ordering of the first visual content item and the second visual content item, modifying the values of the first work unit parameter for both the first work unit record and the second work unit record based on the first directional ordering.

16. The method of claim 15, wherein the given work unit parameter is due date parameter such that modifying the values for the work unit records represented by the two or more of the visual content items comprises setting the values to a sequential order of dates.

17. The method of claim 12, further comprising:
responsive to the absolute position of the individual visual content items being within a predetermined area on the user interface, modifying the values of a given work unit parameter for the work unit records represented by the individual visual content items within the predetermined area by a predetermined modification, including:
responsive to the first absolute position falling within a first predetermined area, modifying the first value of the first work unit parameter in accordance with a first predetermined modification.

18. The method of claim 11, further comprising:
responsive to obtaining the arrangement information and prior to modifying the values, generating record modification notifications, the record modification notifications conveying recommendations to modify the one or more of the values of the one or more of the work unit parameters based on the arrangement information;
effectuating presentation of the record modification notifications on the client computing platforms associated with the users; and
responsive to obtaining approval, via further user input in the record modification notifications, executing modifications of the one or more of the values of the one or more of the work unit parameters based on the arrangement information.

19. The method of claim 11, wherein the user interface comprises a digital space that is part of the collaboration environment through which the visual content items representing the work unit records are instantiated into the digital space and positioned based on the user input.

20. The method of claim 9, wherein instantiation into the digital space is accomplished through drag-and-drop input.

* * * * *